(12) United States Patent
Searby et al.

(10) Patent No.: US 8,009,417 B2
(45) Date of Patent: Aug. 30, 2011

(54) REMOVABLE AIRFLOW GUIDE ASSEMBLY FOR A COMPUTER SYSTEM

(75) Inventors: Tom J. Searby, Eaton, CO (US); Robert L. Crane, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 12/549,861

(22) Filed: Aug. 28, 2009

(65) Prior Publication Data
US 2011/0051358 A1    Mar. 3, 2011

(51) Int. Cl.
*H05K 7/20* (2006.01)

(52) U.S. Cl. ........... 361/679.5; 361/679.48; 361/679.49; 361/679.51; 361/694; 361/695; 165/80.3; 165/121; 165/122; 165/104.33; 464/184

(58) Field of Classification Search ............. 361/679.46, 361/679.47, 679.48, 679.49, 679.5, 679.51, 361/679.54, 690–697, 688, 689, 712–720, 361/724–727, 731, 752, 775, 831; 454/184; 165/21–126, 185; 62/276, 371, 259.2
See application file for complete search history.

(56) References Cited

U.S. PATENT DOCUMENTS

| | | | | |
|---|---|---|---|---|
| 5,287,244 A * | 2/1994 | Hileman et al. | ......... | 361/679.47 |
| 5,432,674 A * | 7/1995 | Hardt | ............. | 361/694 |
| 5,493,457 A * | 2/1996 | Kawamura et al. | ........... | 720/648 |
| 5,796,580 A * | 8/1998 | Komatsu et al. | ......... | 361/679.48 |
| 5,822,188 A * | 10/1998 | Bullington | .................... | 361/695 |
| 5,860,291 A * | 1/1999 | Johnson et al. | ............. | 62/259.2 |
| 6,504,718 B2 * | 1/2003 | Wu | ............................. | 361/695 |
| 6,525,937 B2 * | 2/2003 | Yanagida | ...................... | 361/695 |
| 6,744,632 B2 * | 6/2004 | Wilson et al. | ................. | 361/695 |
| 6,970,353 B2 * | 11/2005 | Brovald et al. | ............ | 361/679.5 |
| 7,248,472 B2 * | 7/2007 | Vinson et al. | ................. | 361/694 |
| 7,403,387 B2 * | 7/2008 | Pav et al. | ...................... | 361/694 |
| 7,408,773 B2 * | 8/2008 | Wobig et al. | .................. | 361/695 |
| 7,457,114 B2 * | 11/2008 | Peng et al. | .............. | 361/679.48 |
| 7,474,528 B1 * | 1/2009 | Olesiewicz et al. | ........... | 361/695 |
| 7,599,180 B2 * | 10/2009 | Ong et al. | ................ | 361/679.51 |
| 7,643,292 B1 * | 1/2010 | Chen | ............................. | 361/695 |
| 7,660,111 B2 * | 2/2010 | Barringer et al. | ........ | 361/679.49 |
| 2004/0095723 A1 * | 5/2004 | Tsai et al. | ...................... | 361/695 |
| 2007/0133167 A1 * | 6/2007 | Wagner et al. | ................ | 361/687 |

* cited by examiner

*Primary Examiner* — Michael V Datskovskiy

(57) ABSTRACT

In accordance with at least some embodiments, a computer system include a chassis and a main airflow channel within the chassis. The computer system also includes multiple processors and multiple memory banks positioned in the main airflow channel. The computer system also includes a removable airflow guide assembly installed in the main airflow channel, wherein the removable airflow guide assembly divides the main airflow channel into a processor-side airflow channel and a memory-side airflow channel.

18 Claims, 12 Drawing Sheets

REMOVABLE AIRFLOW GUIDE ASSEMBLY FOR A COMPUTER SYSTEM

BACKGROUND

Various components of electronic devices (e.g., computers) emit heat. As the heat within an electronic device increases, the operation and/or reliability of components may be negatively affected. In order to facilitate heat dissipation, ventilation and/or cooling techniques are needed.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to installation and use of a removable airflow guide assembly in the main airflow channel of an electronic device (e.g., a computer). The removable airflow guide assembly improves ventilation and/or cooling of components in the main airflow channel. In accordance with at least some embodiments, the removable airflow guide assembly comprises multiple parts that function together to improve ventilation within the main airflow channel. Also, the removable airflow guide assembly may acoustically separate an intake airflow side and an exhaust airflow side of the main airflow channel.

Figure 1A:
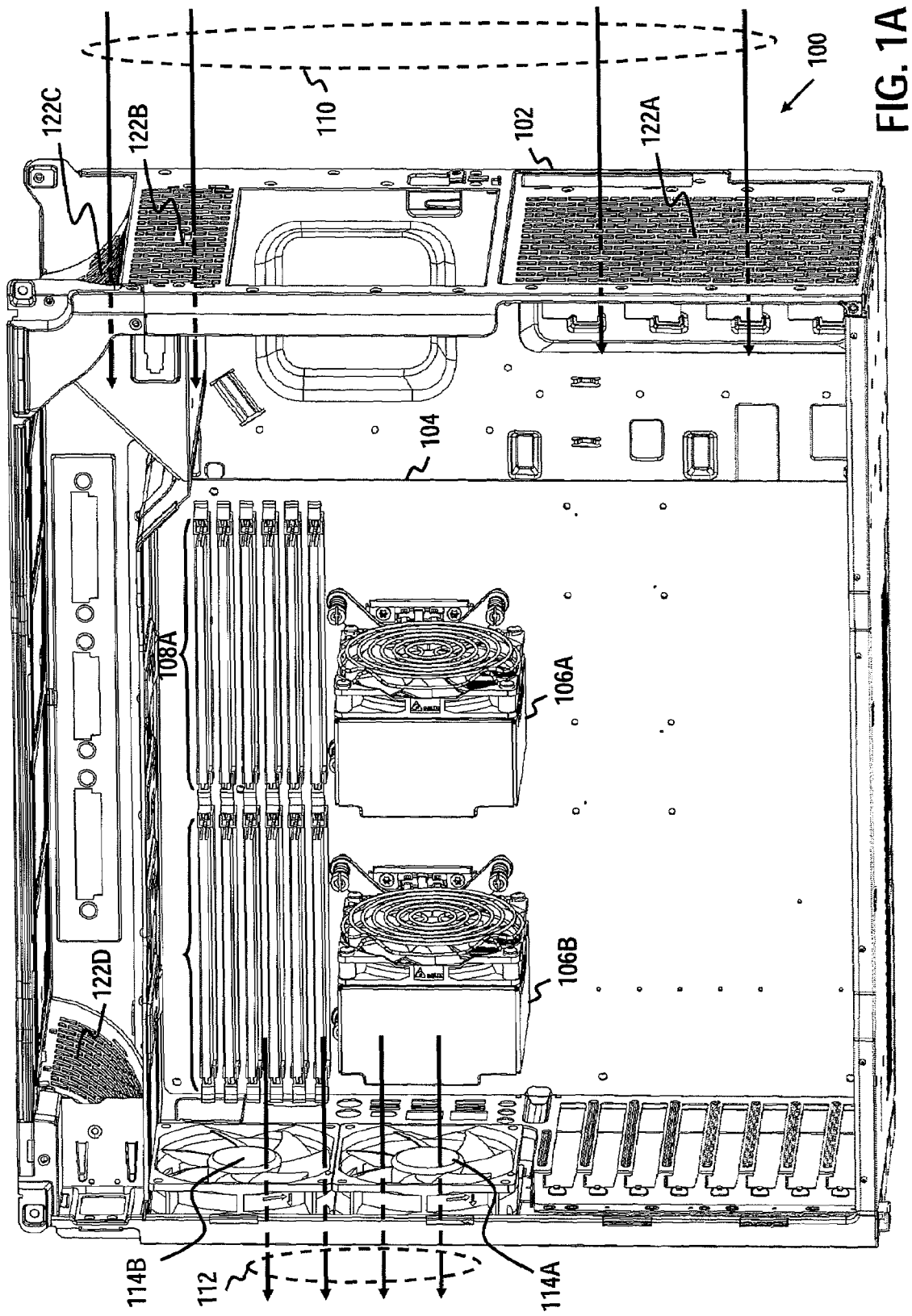
FIGS. 1A-B show perspective views of a computer system with air-cooled processors before installation of an airflow guide assembly in accordance with an embodiment of the disclosure.
Figure 1B:
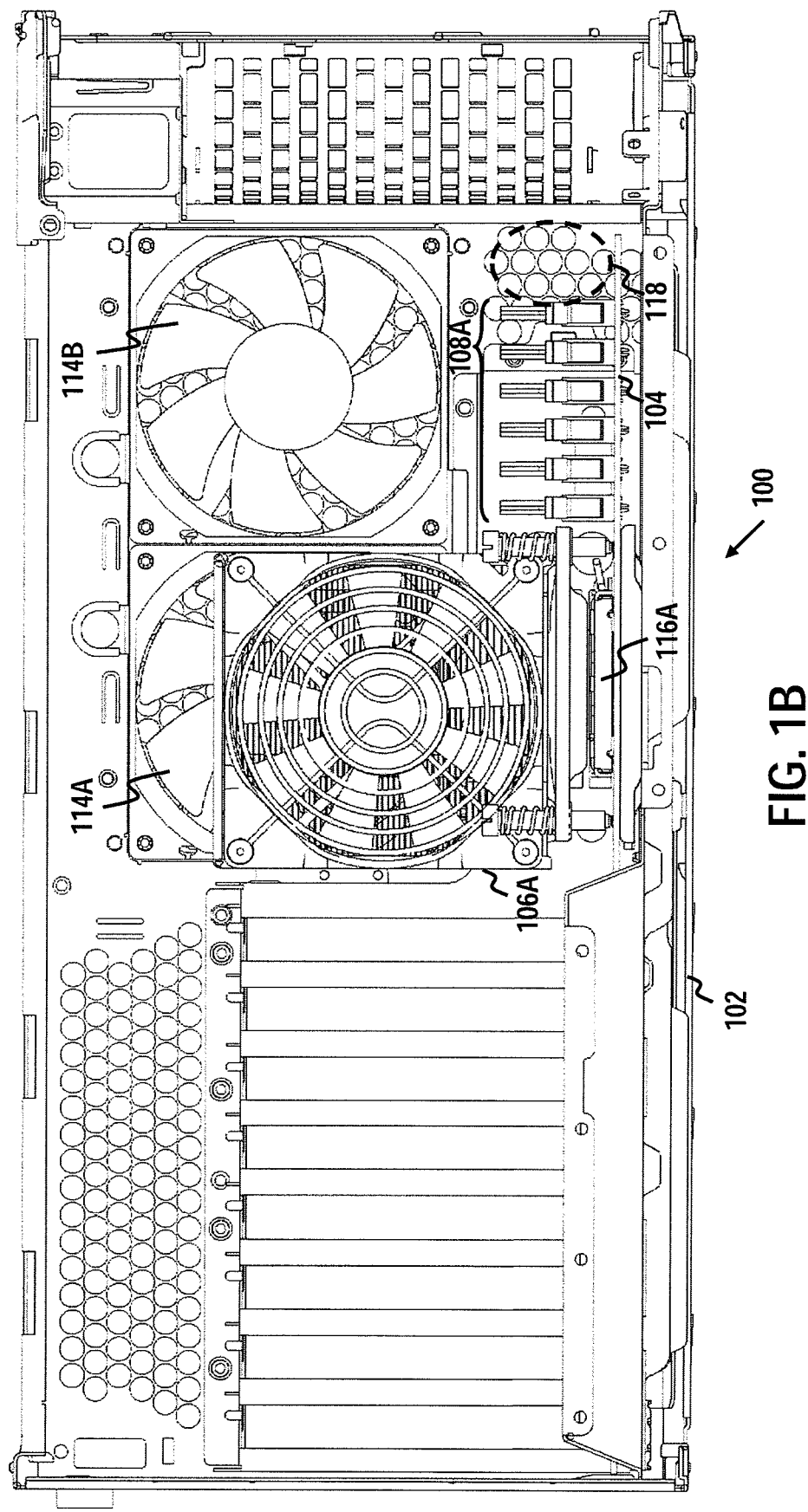

FIGS. 1A-1B show perspective views of a computer system 100 with air-cooled processors before installation of an airflow guide assembly in accordance with an embodiment of the disclosure. In FIG. 1A, an overhead view of the computer system 100 is provided. As shown, the computer system 100 comprises a chassis 102 having various vented areas 122A-122D. Regardless of size and style, the vented areas 122A-122D enable air to flow into the interior of the chassis 102. A plurality of exhaust fans 114A and 114B are also mounted to the chassis 102 to draw heated air out of the chassis 102.

Within the chassis 102, a printed circuit board (PCB) 104 (e.g., a motherboard) having various components mounted thereto is placed. As shown, a plurality of processor air-coolers 106A and 106B and a plurality of memory banks 108A and 108B may be mounted to the PCB 104. As an example, each of the processor air-coolers 106A and 106B may comprise a heatsink that draws heat away from a processor core and a fan to create airflow across the heatsink. Meanwhile, each of the memory banks 108A and 108B may comprise a plurality of memory modules plugged into corresponding connectors mounted to the PCB 104. Although the embodiment of FIG. 1A shows two processor air-coolers and two memory banks, alternative embodiments may employ other quantities (more or less) of such processor air-coolers and/or memory banks.

As shown in FIG. 1A, the plurality of processor air-coolers 106A and 106B are aligned (e.g., one after the other) between an intake airflow side 110 and an exhaust airflow side 112 of the chassis 102. Likewise, the plurality of memory banks 108A and 108B are aligned (e.g., one after the other) between the intake airflow side 110 and the exhaust airflow side 112. Hereafter, the interior chassis space between the intake airflow side 110 and the exhaust airflow side 112 will be understood to be the "main airflow channel" of the chassis 102. Thus, in accordance with embodiments, the plurality of processor air-coolers 106A and 106B and the plurality of memory banks 108A and 108B reside in the main airflow channel of the chassis 102.

In FIG. 1B, a side view (as seen from the intake airflow side 110 of the chassis 102) of the computer system 100 is provided. As shown, a processor core 116A is beneath the processor air-cooler 106A. Also, vents 118 are located along the chassis surface near the fan 114B. The line of sight visibility of the fans 114A and 114B in FIG. 1B indicates that there is minimal acoustic separation of the intake airflow side 110 and the exhaust airflow side 112 of the chassis 102. Thus, noise from the fans 114A and 114B at the exhaust airflow side 112 is easily propagated to the intake airflow side 110 of the chassis 102. To many users of the computer system 100, such noise is undesirable.

Figure 2:
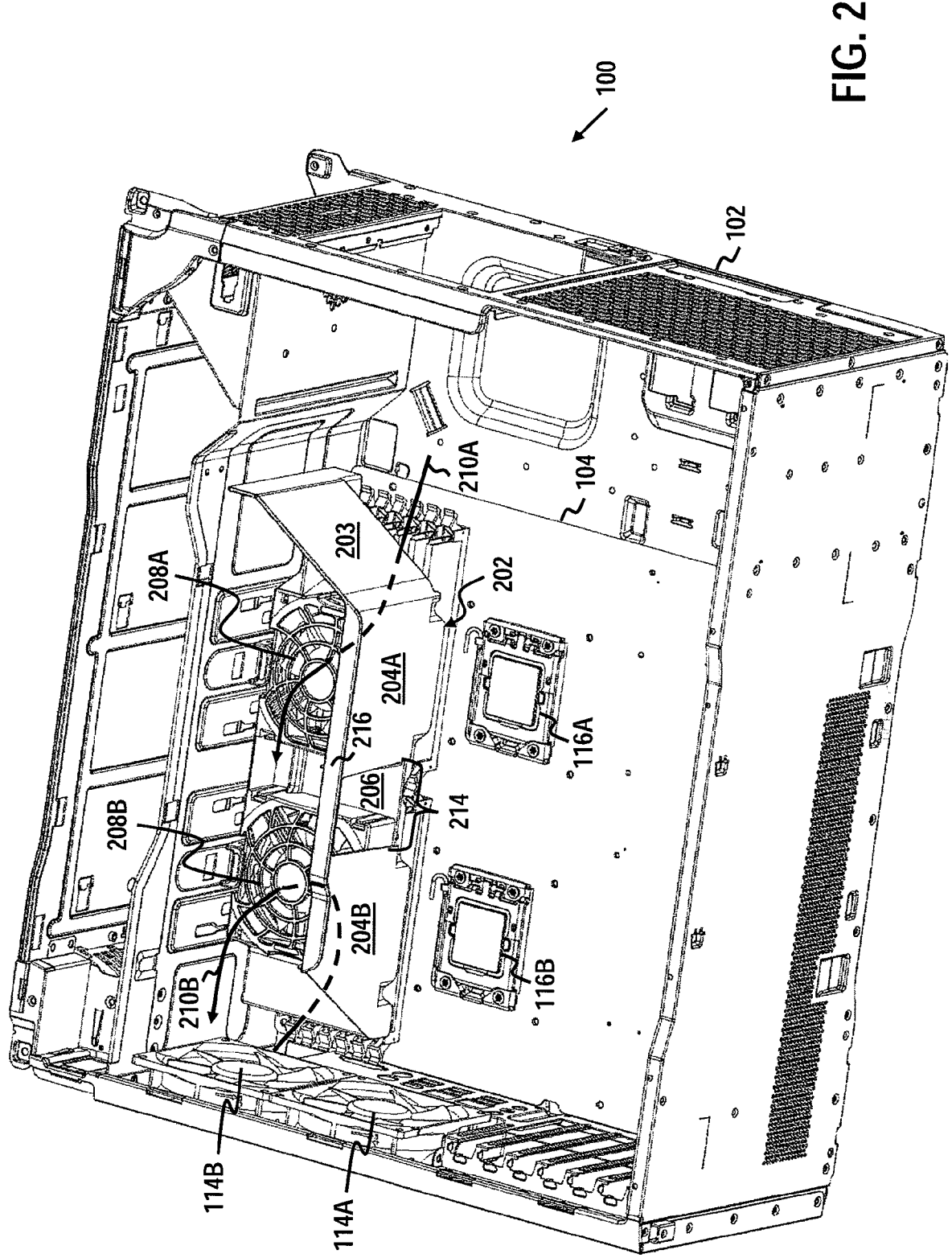
FIG. 2 shows a perspective view of a memory-side airflow guide installed in a computer system chassis in accordance with an embodiment of the disclosure.

FIG. 2 shows a perspective view of a memory-side airflow guide 202 installed in a computer system chassis 102 in accordance with an embodiment of the disclosure. In FIG. 2, the processor air-coolers 106A and 106B have been removed and thus the underlying processors 116A and 116B are visible. As shown, the memory-side airflow guide 202 comprises a base 206 having incorporated therein a pair of fans 208A and 208B positioned over the memory banks 108A and 108B respectively. The memory-side airflow guide 202 also comprises a first side wall 203 nearest the intake airflow side 110 of the chassis 102. As shown, the first side wall 203 is angled (i.e., the memory-side airflow guide 202 does not form a rectangular shape). The memory-side airflow guide 202 also comprises a second side wall 204A adjacent the first side wall 203 and positioned between the memory bank 108A and the processor air-cooler 106A. The memory-side airflow guide 202 also comprises a third side wall 204B positioned between the memory bank 108B and the processor air-cooler 106B. The second side wall 204A and the third side wall 204C are separated by a space 214, but may be joined by a rim 216 that extends over the space 214.

In FIG. 2, airflow arrow 210A shows that air enters into the area of the first memory bank 108A (under the base 206 of the memory-side airflow guide 202) and that the fan 208A directs heated air from the memory bank 108A to enter a memory-side exhaust airflow sub-channel formed at least in part by the memory-side airflow guide 202. Meanwhile, the airflow arrow 210B shows that air enters into the area of the memory bank 108B (under the base 206 of the memory-side airflow guide 202) and that the fan 208B directs heated air from the memory bank 108B to enter the memory-side exhaust airflow sub-channel formed at least in part by the memory-side airflow guide 202. In accordance with at least some embodiments, the air entering the memory bank 108B, as indicated by the airflow arrow 210B, comes from vents 118 in the chassis surface (see FIG. 1B). Thus, it should be understood that some cool air may enter into the chassis 102 through vents (such as vents 118) near the exhaust airflow side 112 of the main airflow channel. For both airflow arrows 210A and 210B, the memory-side exhaust airflow sub-channel directs air towards the exhaust airflow side 112 of the main airflow channel.

The embodiment of FIG. 2 is not intended to limit the memory-side airflow guide 202 to a particular embodiment. In general, a memory-side airflow guide such as the memory-side airflow guide 202 changes the airflow in a main airflow channel by creating a memory-side intake airflow sub-channel and/or a memory-side exhaust airflow sub-channel. As in the embodiment of FIG. 2, fans may be incorporated into a memory-side airflow guide to improve performance of a memory-side intake airflow sub-channel and/or a memory-side exhaust airflow sub-channel.

Figure 3:
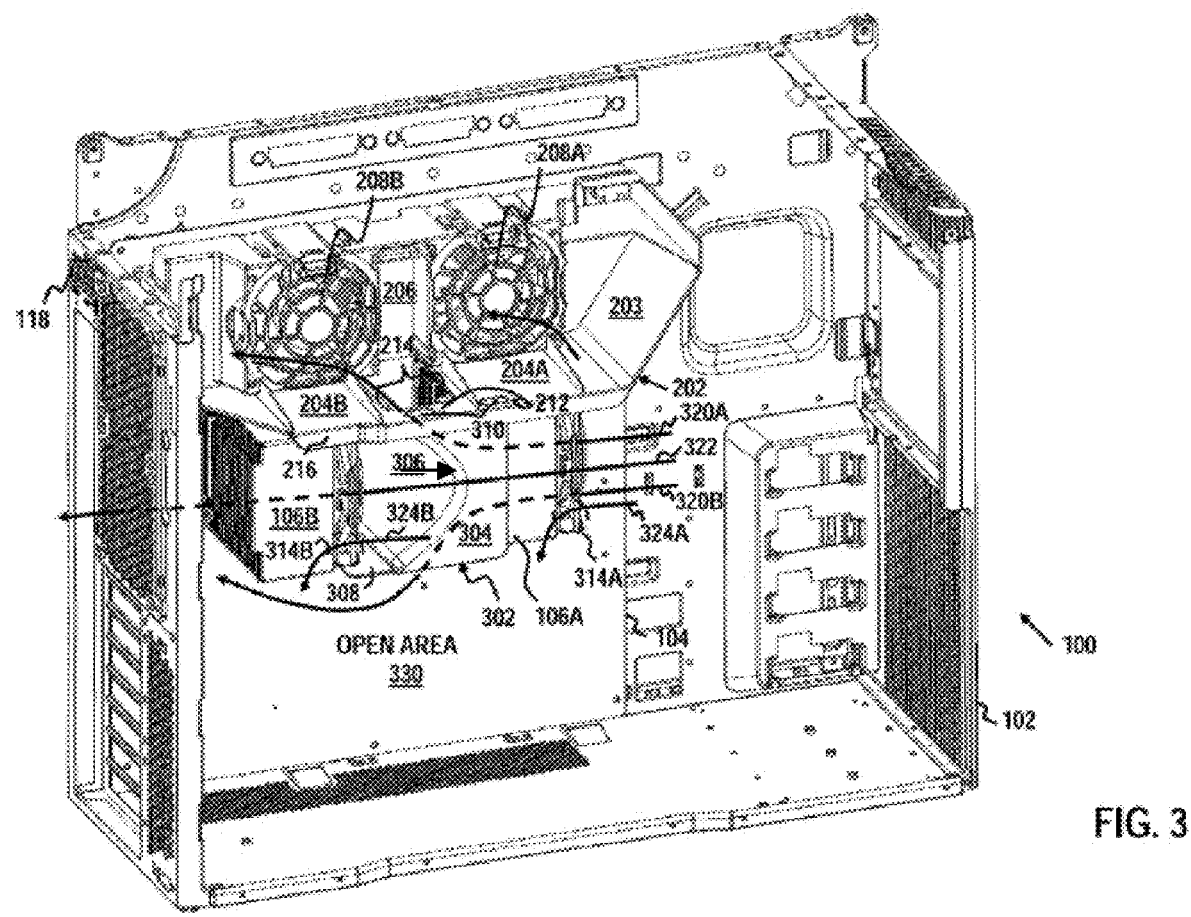
FIG. 3 shows a perspective view of a processor-side airflow guide in accordance with an embodiment of the disclosure.

FIG. 3 shows a perspective view of a processor-side airflow guide 302 in accordance with an embodiment of the disclosure. In the embodiment of FIG. 3, the processor-side airflow guide 302 comprises a flat section 304 and a rounded deflector section 306. The flat section 304 may, for example, partially rest on the processor air-cooler 106A and prevents heated air from the processor air-cooler 106A from mixing with the cooler air (e.g., related to the airflow arrow 322) intended for the processor 116B and/or the processor air-cooler 106B. Meanwhile, the rounded deflector section 306 extends into the exhaust airflow of the processor air-cooler 106A and deflects heated air away from the processor 116B and/or the processor air-cooler 106B. The processor-side airflow guide 302 also comprises a side surface 308 (see also FIG. 4) that extends from the deflector section 306 towards the processor air-cooler 106B. The side wall 308 functions to prevent heated air deflected (by the deflector section 306) towards the open area 330 from entering the processor air-cooler 106B.

In accordance with some embodiments, the processor-side airflow guide 302 attaches to the memory-side airflow guide 202. For example, in the embodiment of FIG. 3, the processor-side airflow guide 302 comprises a plurality of attachment features (e.g., hooks) 310 that fit into corresponding slots 212 of the memory-side airflow guide 202. Upon attachment to the memory-side airflow guide 202, the processor-side airflow guide 302 is able to deflect heated air from the processor air-cooler 106A away from the processor 116B and/or the processor air-cooler 106B. The airflow arrow 320A shows that air enters into the area of the processor 116A and that heated air from the processor air-cooler 106A is deflected by the processor-side airflow guide 302 through the space 214 and into the memory-side exhaust airflow sub-channel. Meanwhile, the airflow arrow 320B shows that air enters into the area of the processor 116A and that heated air from the processor air-cooler 106A is deflected by the processor-side airflow guide 302 into an open area 330 of the main airflow channel. For both airflow arrows 320A and 320B, the processor-side airflow guide 302 operates to deflect heated air from the processor air-cooler 106A away from the processor 116B and/or the processor air-cooler 106B. Meanwhile, the airflow arrow 322 shows that some air goes past (above) the processor air-cooler 106A and enters into the area of the processor 116B and that heated air from the processor air-cooler 106B is output to the exhaust airflow side 112 of the main airflow channel. The heated air from the processor air-cooler 106A also is eventually output to the exhaust airflow side 112 of the main airflow channel as shown by airflow arrows 320A and 320B.

FIG. 3 also shows that each of the processor air-coolers 106A and 106B implement at least one deflector 314A and 314B respectively to deflect additional air towards components in the open area 330 of the main airflow chamber. More specifically, the airflow arrow 324A shows that some air going to the processor air-cooler 106A is directed by the deflector 314A into areas of the main airflow channel near the processor 116A. Meanwhile, the airflow arrow 324B shows that some air going to the processor air-cooler 106B is directed by the deflector 314B into areas of the main airflow channel near the processor 116B. Thus, the deflectors 314A and 314B may be used, for example, to cool components that are nearby the processors 116A and 116B on the PCB 104.

The embodiment of FIG. 3 is not intended to limit the processor-side airflow guide 302 to a particular embodiment. In general, a processor-side airflow guide such as the processor-side airflow guide 302 changes the airflow in a main airflow channel by creating a processor-side intake airflow sub-channel and/or a processor-side exhaust airflow sub-channel. As in the embodiment of FIG. 3, a processor-side airflow guide may deflect heated air output by a processor air-cooler away from one or more other processor air-coolers. Also, a processor-side airflow guide may attach to other airflow guide parts (such as a memory-side airflow guide) to create a more extensive airflow guide assembly in the main airflow channel of a chassis.

Figure 4:
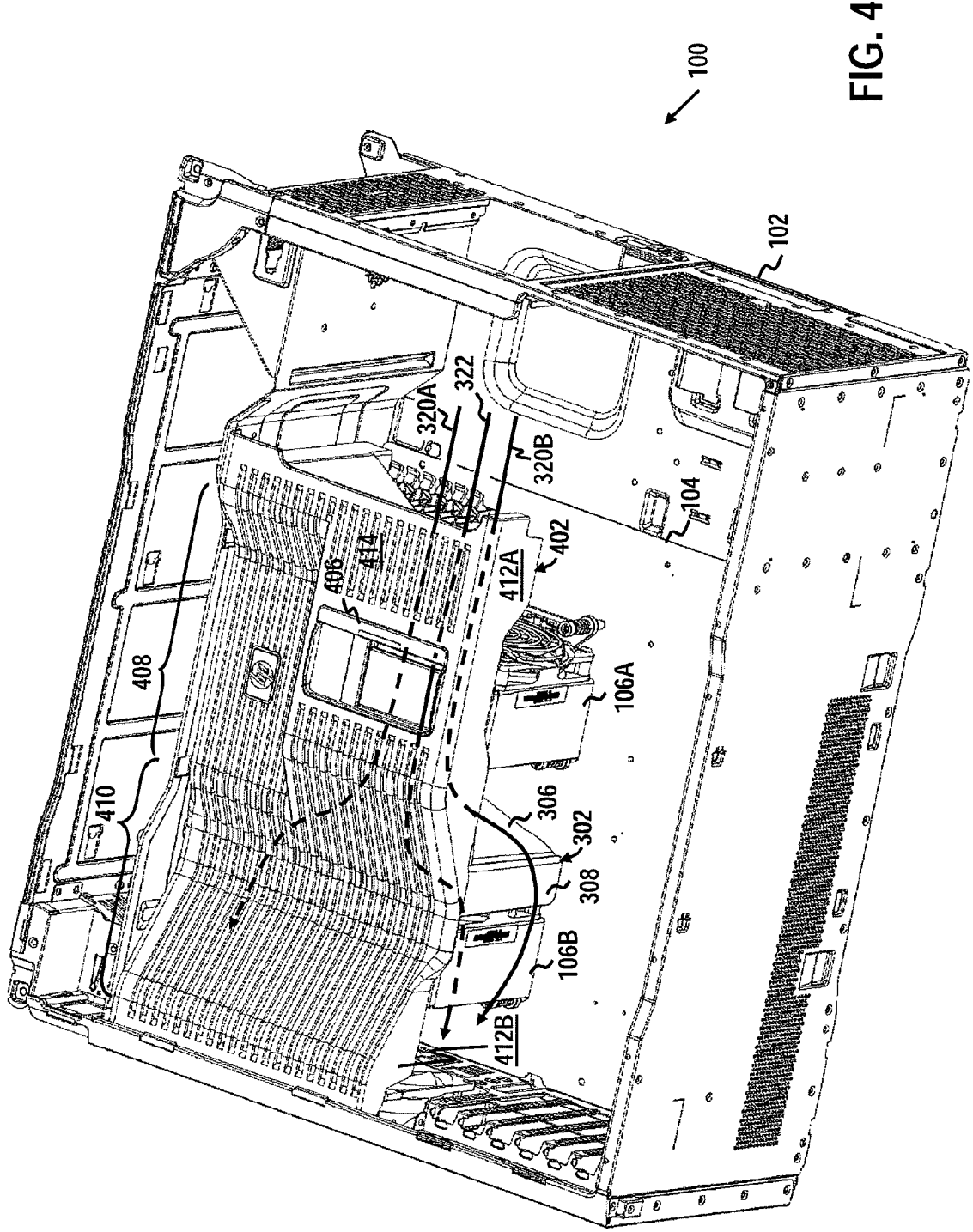
FIG. 4 shows a perspective view of an airflow guide cover in accordance with an embodiment of the disclosure.

FIG. 4 shows a perspective view of an airflow guide cover 402 in accordance with an embodiment of the disclosure. In the embodiment of FIG. 4, the airflow guide cover 402 is placed over the memory-side airflow guide 202 and the processor-side airflow guide 302. In operation, the airflow guide cover 402 functions to improve separation of the memory-side exhaust airflow sub-channel (formed by the memory-side airflow guide 202) from the processor-side of the main airflow channel. To accomplish this function, the airflow guide cover 402 comprises a first concave section 408 and a second concave section 410. In the embodiment of FIG. 4, the concave sections 408 and 410 are relative to a base section 414 in which a handle 406 is formed to facilitate installation and/or removal of the airflow guide cover 402. The airflow guide cover 402 also comprises side sections 412A and 412B that extend downward from the base section 414 and/or the second concave section 410 towards the processor air-coolers 106A and 106B. In FIG. 4, the airflow arrows 320A, 320B and 322 are shown in the same relative position as in FIG. 3, but with the airflow guide cover 402 added in FIG. 4.

Figure 5:
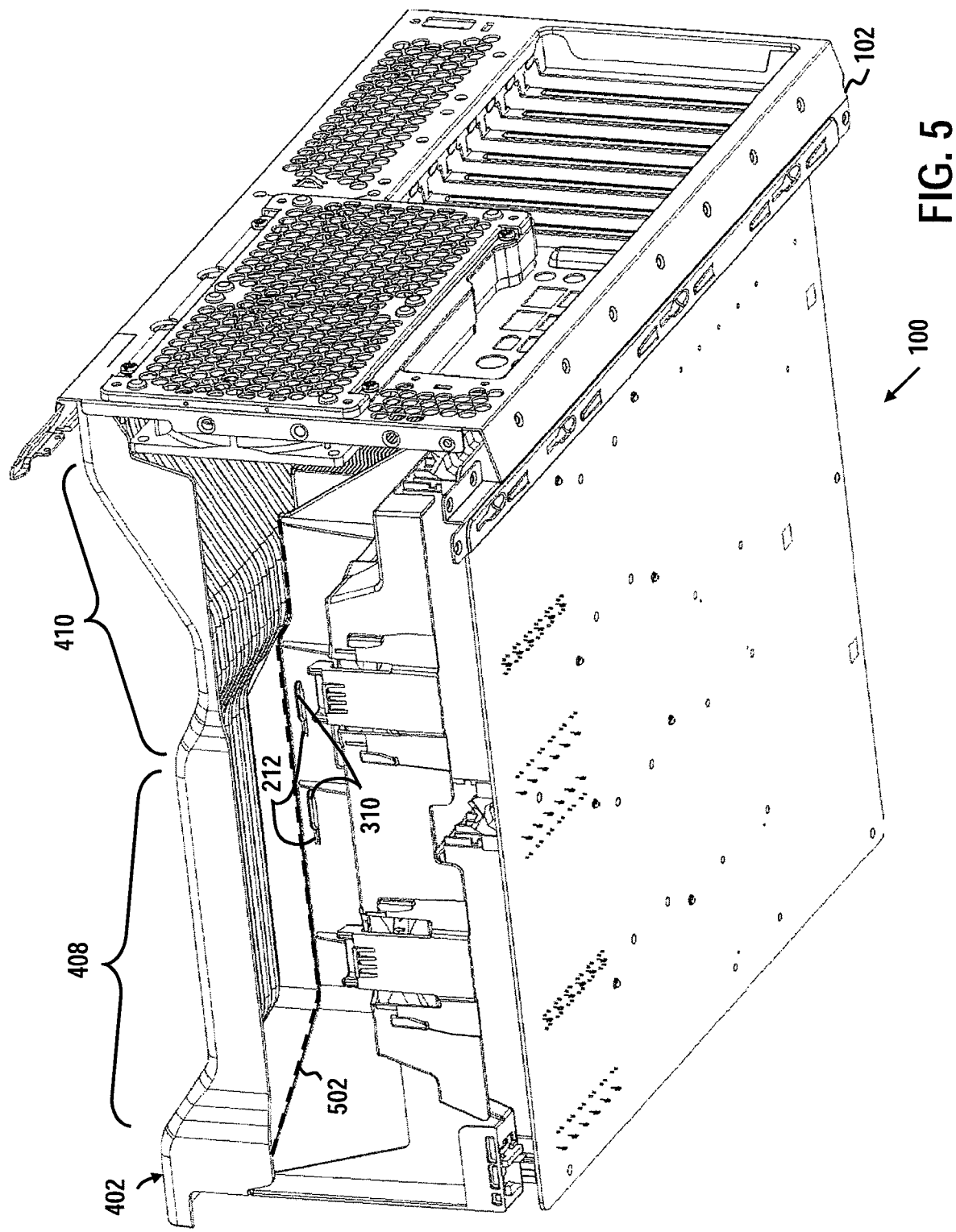
FIG. 5 shows alignment of the airflow guide cover of FIG. 4 with the memory-side airflow guide of FIG. 2 to separate memory-side exhaust airflow from processor-side airflow in accordance with an embodiment of the disclosure.

FIG. 5 shows alignment of the airflow guide cover 402 of FIG. 4 with the memory-side airflow guide 202 of FIG. 2 to separate memory-side exhaust airflow from processor-side airflow in accordance with an embodiment of the disclosure. As shown in FIG. 5, an edge 502 (represented as a dashed line) of the airflow guide cover 402 aligns substantially with an edge of the memory-side airflow guide 202 to separate the memory-side exhaust airflow sub-channel (formed by the memory-side airflow guide 202) from the processor-side of the main airflow channel.

The embodiment of FIGS. 4 and 5 is not intended to limit the airflow guide cover 402 to a particular embodiment. In general, an airflow guide cover such as the processor-side airflow guide 402 changes the airflow in a main airflow channel by improving separation of intake airflow sub-channels and/or exhaust airflow sub-channels formed by other airflow guide parts (e.g., a memory-side airflow guide and/or a processor-side airflow guide). An airflow guide cover may attach to other airflow guide parts (such as a memory-side airflow guide or a processor-side airflow guide) to create a more extensive airflow guide assembly in the main airflow channel of a chassis.

Figure 6:
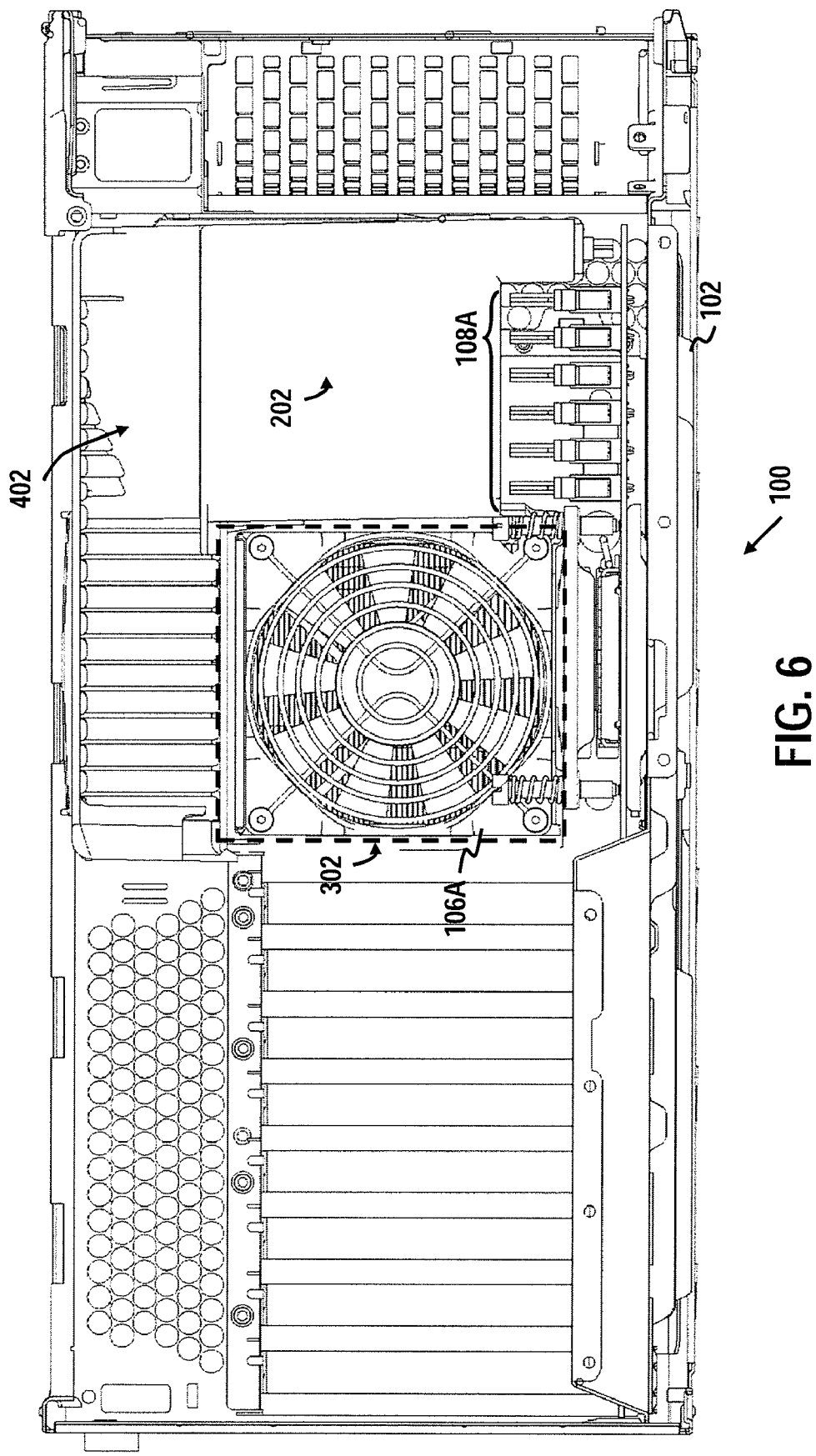
FIG. 6 shows acoustic separation between sides of a main airflow channel provided by the airflow guide assembly embodiments of FIGS. 2-5.

FIG. 6 shows acoustic separation between the intake airflow side 110 and the exhaust airflow side 112 of a main airflow channel provided by the airflow guide assembly embodiment of FIGS. 2-5. In FIG. 6, the memory-side airflow guide 202, the processor-side airflow guide 302 (located behind the processor air-cooler 106A and shown with dashed lines), and the airflow guide cover 402 are installed. In addition to changing the airflow in the main airflow channel of the chassis 102, the memory-side airflow guide 202, the processor-side airflow guide 302, and the airflow guide cover 402 provide acoustic separation between the intake airflow side 110 and the exhaust airflow side 112 of the main airflow channel. For example, as seen in FIG. 6, the fans 114A and 114B are no longer visible after installation of the memory-side airflow guide 202, the processor-side airflow guide 302, and the airflow guide cover 402. Thus, there will be a reduction of noise from the fans 114A and 114B at the air intake side 110 of the chassis.

Figure 7:
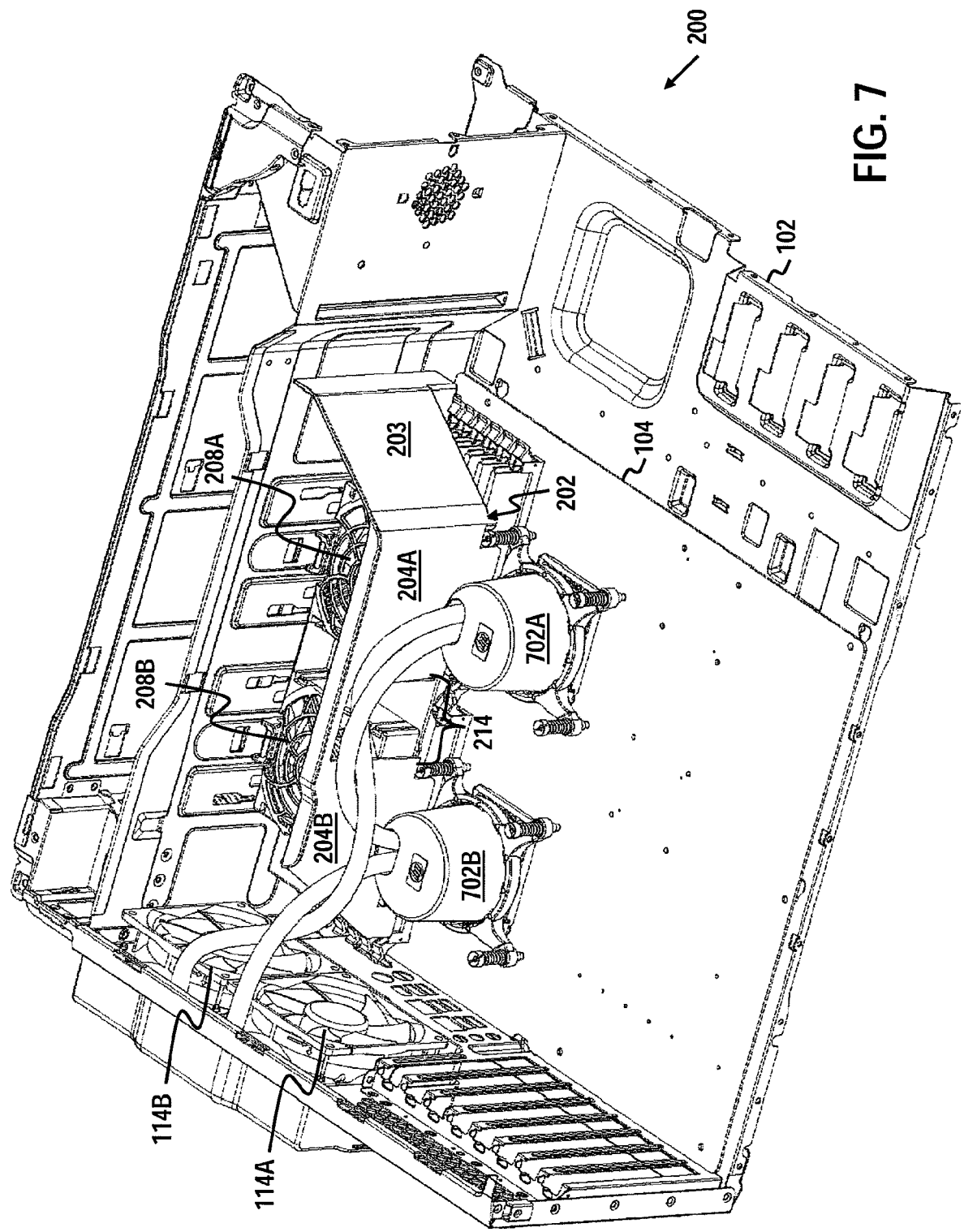
FIG. 7 shows a perspective view of another computer system with liquid-cooled processors before installation of an airflow guide assembly in accordance with an embodiment of the disclosure.

FIG. 7 shows a perspective view of another computer system 200 with liquid-cooled processors before installation of an airflow guide in accordance with an embodiment of the disclosure. In FIG. 7, processor liquid-coolers 702A and 702B are implemented instead of the processor air-coolers 106A and 106B described previously. For the embodiment of FIG. 7, the memory-side airflow guide 202 has been installed.

Figure 8:
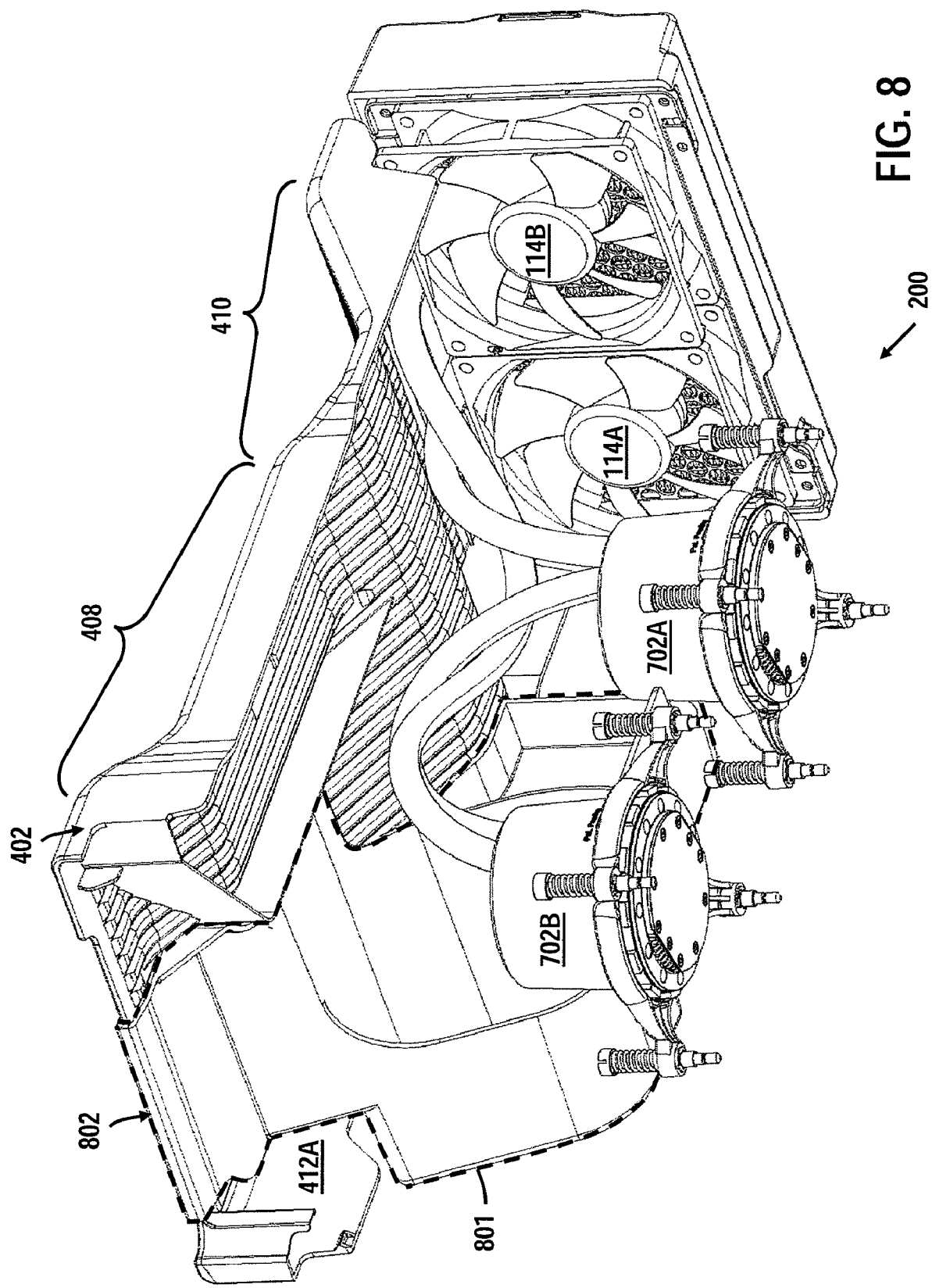
FIG. 8 shows a perspective view of a processor-side airflow guide for liquid-cooled processors in accordance with an embodiment of the disclosure.

FIG. 8 shows a perspective view of a processor-side airflow guide 802 for liquid-cooled processors in accordance with an embodiment of the disclosure. As shown, the processor-side airflow guide 802 is positioned under portions of the airflow guide cover 402. The outline 801 (shown with a dashed line) of the processor-side airflow guide 802 indicates the position of the processor-side airflow guide 802 relative to the airflow guide cover 402 and the processor liquid-coolers 702A and 702B.

Figure 9:
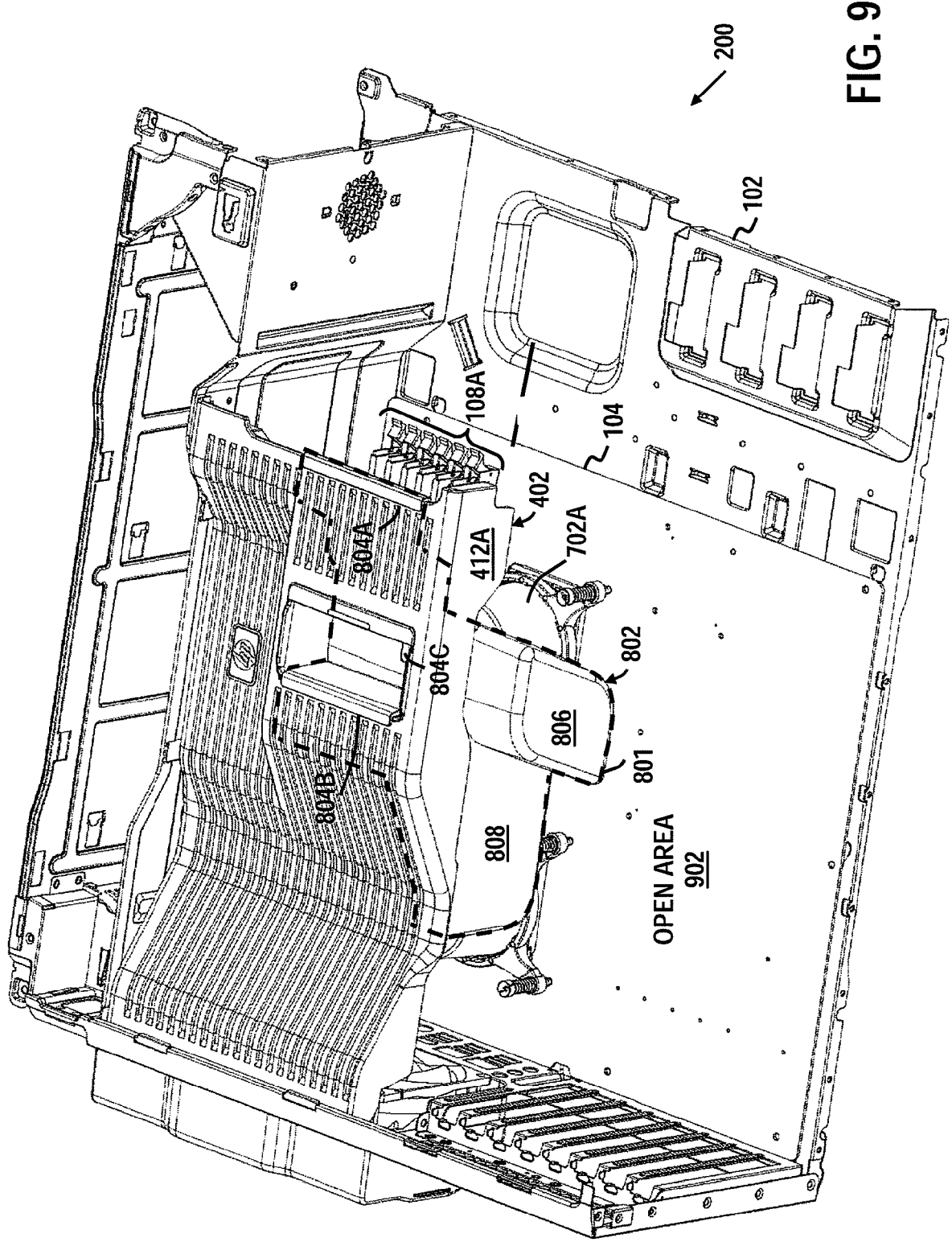
FIG. 9 shows the processor-side airflow guide of FIG. 8 installed in a computer system chassis in accordance with an embodiment of the disclosure.

FIG. 9 shows the processor-side airflow guide 802 of FIG. 8 installed in a computer system chassis 102 in accordance with an embodiment of the disclosure. In FIG. 9, the outline 801 (shown with a dashed line) of the processor-side airflow guide 802 indicates the position of the processor-side airflow guide 802 relative to the airflow guide cover 402 and the processor liquid-coolers 702A and 702B. As shown, the processor-side airflow guide 802 comprises attachment features 804A-804C that facilitate attachment of the processor-side airflow guide 802 to the airflow guide cover 402. Specifically, each of the attachment features 804A and 804B wraps around a corresponding edge of the airflow guide cover 402 to hold the processor-side airflow guide 802 is a desired position relative to the airflow guide cover 402. Meanwhile, the attachment feature 804C comprises a snap feature that holds the processor-side airflow guide 802 in a stable position once the attachment features 804A and 804B are in place (e.g., by pressing the processor-side airflow guide 802 against the airflow guide cover 402 in the opposite direction compared to the attachment features 804A and 804B).

The processor-side airflow guide 802 also comprises an extension wall 806 that juts out into an open area 902 of the main airflow channel. The extension wall 806 guides air, for example, to components near the processor liquid-cooler 702A. The processor-side airflow guide 802 also comprises a side wall 808 that separates airflow near the processor liquid-coolers 702A and 702B from airflow in the open area 902 of the main airflow channel.

Figure 10:
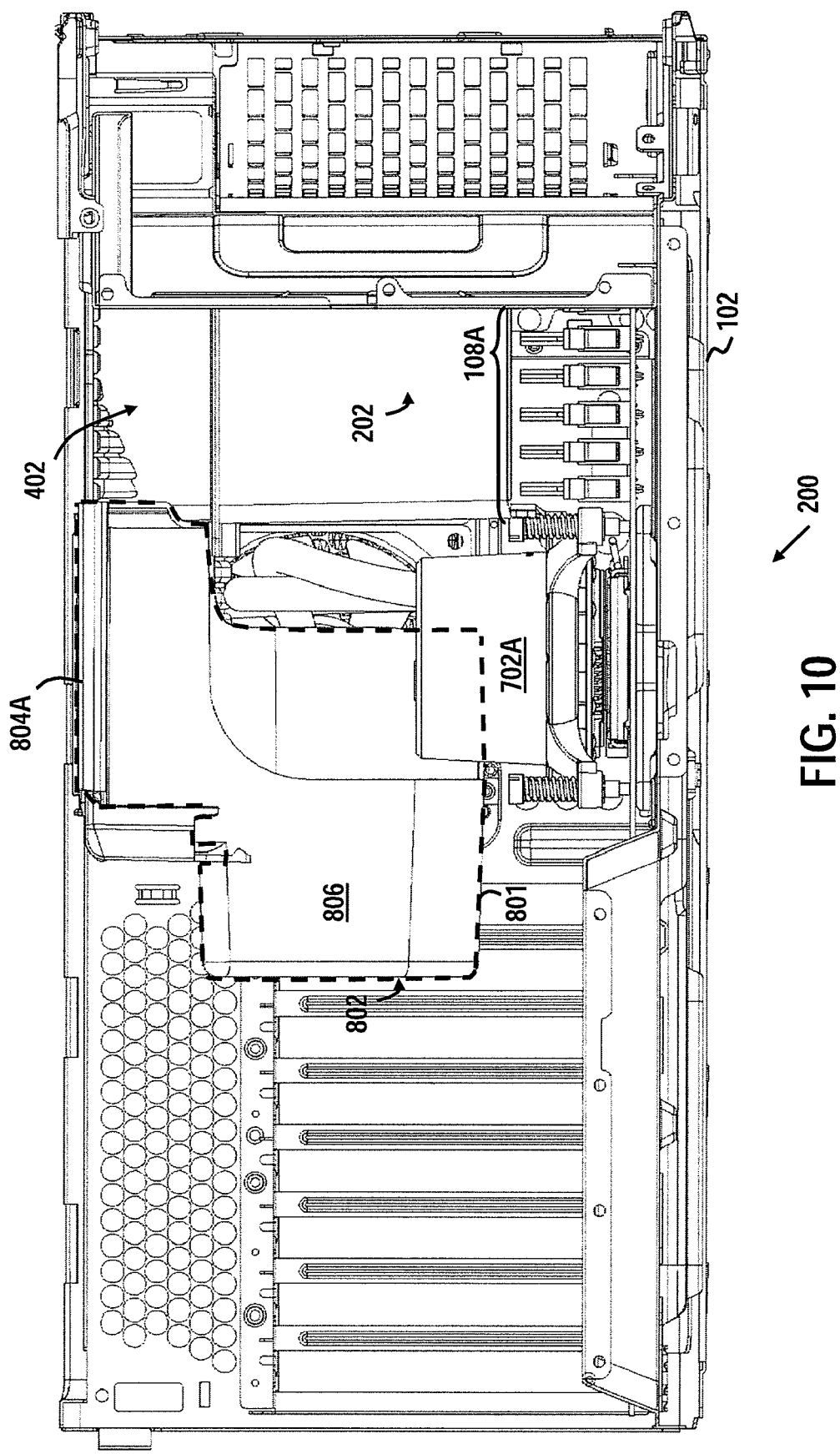
FIG. 10 shows acoustic separation between sides of a main airflow channel provided by an airflow guide assembly in accordance with the embodiments of FIGS. 7-9.

FIG. 10 shows acoustic separation between sides of a main airflow channel provided by an airflow guide assembly in accordance with the embodiments of FIGS. 7-9. In FIG. 10, the memory-side airflow guide 202, the processor-side airflow guide 802, and the airflow guide cover 402 are installed. In addition to changing the airflow in the main airflow channel of the chassis 102, the memory-side airflow guide 202, the processor-side airflow guide 802, and the airflow guide cover 402 provide acoustic separation between the intake airflow side 110 and the exhaust airflow side 112 of the main airflow channel. For example, as seen in FIG. 10, the fans 114A and 114B are no longer visible after installation of the memory-side airflow guide 202, the processor-side airflow guide 802, and the airflow guide cover 402. Thus, there will be a reduction of noise from the fans 114A and 114B at the intake airflow side 110 of the chassis.

Figure 11:
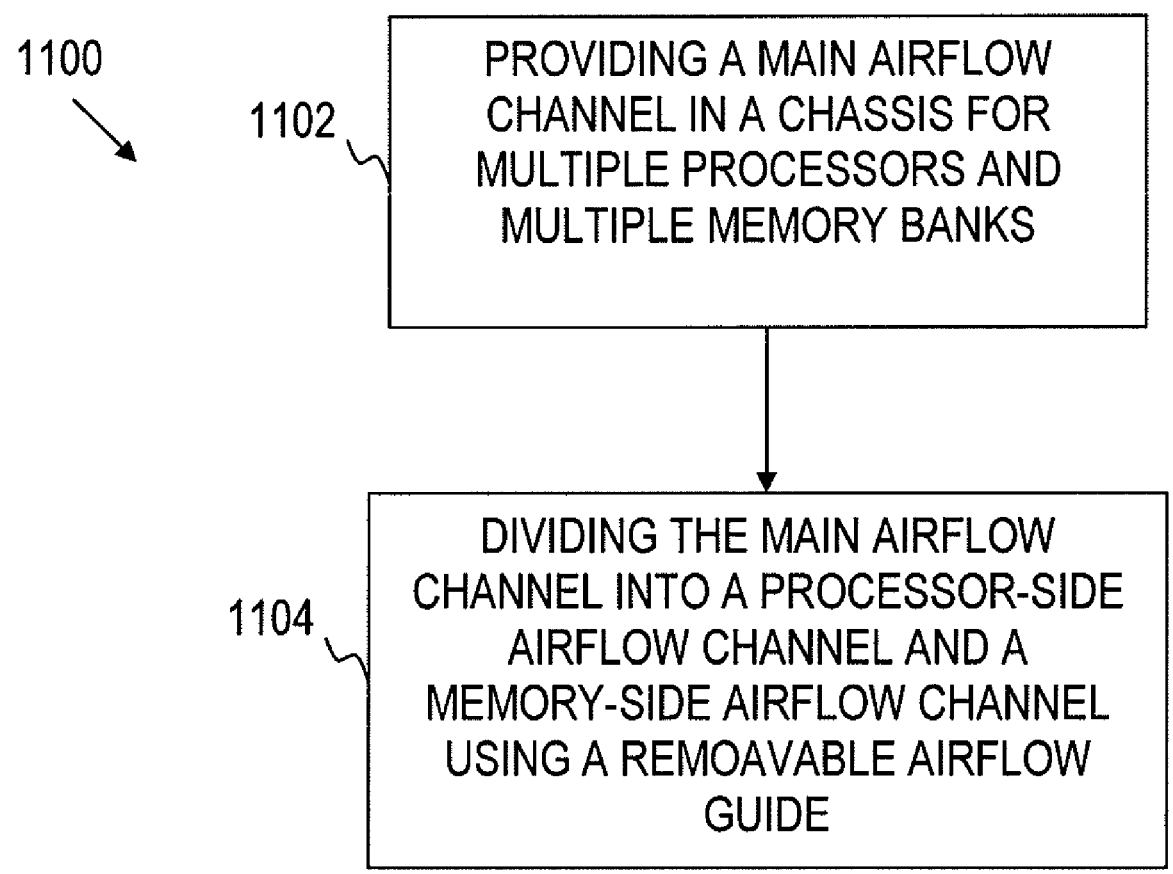
FIG. 11 shows a method in accordance with embodiments of the disclosure.

FIG. 11 shows a method 1100 in accordance with embodiments of the disclosure. As shown in FIG. 11, the method 1100 comprises providing a main airflow channel in a chassis for multiple processor and multiple memory banks (block 1102). The method 1100 also comprises a dividing the main airflow channel into a processor-side airflow channel and a memory-side airflow channel using a removable airflow guide assembly (block 1104).

In various embodiments, the method 1100 also may comprise additional steps that are combined individually or together with the method 1100. For example, the method 1100 may additionally comprise dividing, with the removable airflow guide, the memory-side airflow channel into multiple memory-side intake airflow sub-channels and a memory-side exhaust airflow sub-channel. Additionally, the method 1100 may comprise deflecting, with the removable airflow guide assembly, exhaust airflow in the processor-side airflow channel to the memory-side exhaust airflow sub-channel. Additionally, the method 1100 may comprise providing, with the removable airflow guide assembly, a fan over each memory bank. Additionally, the method 1100 may comprise attaching a memory-side airflow guide and a processor-side airflow guide together to form the removable airflow guide assembly. Additionally, the method 1100 may comprise placing an airflow guide cover over the memory-side airflow guide and the processor-side airflow guide to form the removable airflow guide assembly. In some embodiments, the airflow guide cover is substantially aligned with an edge of the memory-side airflow guide to separate memory-side exhaust airflow from processor-side airflow. Additionally, the method 1100 may comprise acoustically separating, with the removable airflow guide assembly, an intake airflow side and an exhaust airflow side of the main airflow channel.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a chassis;
   a main airflow channel within the chassis;
   multiple processors and multiple memory banks positioned in the main airflow channel;
   a removable airflow guide assembly installed in the main airflow channel, wherein the removable airflow guide assembly divides the main airflow channel into a processor-side airflow channel and a memory-side airflow channel; and
   a processor air-cooler associated with at least one of said processors, wherein the processor air-cooler comprises a deflector that deflects air entering the processor air-cooler into an open area of the main airflow channel.

2. The computer system of claim 1 wherein the removable airflow guide assembly comprises a memory-side airflow guide having a base that incorporates a fan for each memory bank.

3. The computer system of claim 2 wherein the memory-side airflow guide comprises a side surface extending from the base between said multiple processors and said multiple memory banks, the side surface having a space that enables processor-side exhaust airflow to combine with memory-side exhaust airflow.

4. The computer system of claim 3 wherein the removable airflow guide assembly comprises a processor-side airflow guide that deflects exhaust airflow from a processor air-cooler through the space.

5. The computer system of claim 1 wherein the removable airflow guide assembly comprises a memory-side airflow guide and a processor-side airflow guide that attaches to the memory-side airflow guide.

6. The computer system of claim 1 wherein the removable airflow guide assembly comprises a memory-side airflow guide, a processor-side airflow guide, and an airflow guide cover, wherein the airflow guide cover separates memory-side exhaust airflow from the processor-side airflow channel.

7. The computer system of claim 6 wherein, for air-cooled processors, the removable airflow guide assembly comprises a first type processor-side airflow guide and wherein, for liquid-cooled processors, the removable airflow guide assembly comprises a second type processor-side airflow guide.

8. The computer system of claim 7 wherein the first type processor-side airflow guide attaches to the memory-side airflow guide and wherein the second type processor-side airflow guide attaches to the airflow guide cover.

9. The computer system of claim 1 wherein the removable airflow guide assembly acoustically separates an intake airflow side and an exhaust airflow side of the main airflow channel.

10. A method, comprising:
    providing a main airflow channel in a chassis for multiple processors and multiple memory banks;
    dividing the main airflow channel into a processor-side airflow channel and a memory-side airflow channel using a removable airflow guide assembly; and
    attaching a memory-side airflow guide and a processor-side airflow guide together to form the removable airflow guide assembly.

11. The method of claim 10 further comprising dividing, with the removable airflow guide assembly, the memory-side airflow channel into multiple memory-side intake airflow sub-channels and a memory-side exhaust airflow sub-channel.

12. The method of claim 11 further comprising deflecting, with the removable airflow guide assembly, exhaust airflow in the processor-side airflow channel to the memory-side exhaust airflow sub-channel.

13. The method of claim 11 further comprising providing, with the removable airflow guide assembly, a fan over each memory bank.

14. The method of claim 10 further comprising placing an airflow guide cover over the memory-side airflow guide and the processor-side airflow guide to form the removable airflow guide assembly, wherein the airflow guide cover is substantially aligned with an edge of the memory-side airflow guide to separate memory-side exhaust airflow from processor-side airflow.

15. The method of claim 10 further comprising acoustically separating, with the removable airflow guide assembly, an intake airflow side and an exhaust airflow side of the main airflow channel.

16. A removable airflow guide assembly for a computer system, comprising:
    a memory-side airflow guide;
    an airflow guide cover aligned with at least one edge of the memory-side airflow guide to substantially isolate a memory-side exhaust airflow channel associated with the memory-side airflow guide; and
    a processor-side airflow guide that selectively attaches to either the memory-side airflow guide or the airflow guide cover.

17. The removable airflow guide assembly of claim 16 wherein the memory-side airflow guide comprises a base and a side surface having a space and wherein the processor-side airflow guide comprises a deflector configured to direct processor-side exhaust air through the space to the memory-side exhaust airflow channel.

18. The removable airflow guide assembly of claim 17 further comprising at least one fan incorporated into the base.

* * * * *